United States Patent
Kaestli et al.

(10) Patent No.: US 10,282,336 B2
(45) Date of Patent: May 7, 2019

(54) COMBINATION OF BUSES FOR A HAZARD MANAGEMENT SYSTEM, HAZARD MANAGEMENT SYSTEM, AND METHOD OF OPERATING THE HAZARD MANAGEMENT SYSTEM

(71) Applicant: SIEMENS SCHWEIZ AG, Zurich (CH)

(72) Inventors: Urs Kaestli, Maennedorf (CH); Simon Kuenzli, Winterthur (CH)

(73) Assignee: Siemens Schweiz AG, Zurich (CH)

( * ) Notice: Subject to any disclaimer, the term of this patent is extended or adjusted under 35 U.S.C. 154(b) by 290 days.

(21) Appl. No.: 14/607,268

(22) Filed: Jan. 28, 2015

(65) Prior Publication Data
US 2015/0212965 A1     Jul. 30, 2015

(30) Foreign Application Priority Data

Jan. 28, 2014   (EP) .................................... 14152796

(51) Int. Cl.
| | |
|---|---|
| *G06F 13/40* | (2006.01) |
| *G08B 13/196* | (2006.01) |
| *G08B 29/16* | (2006.01) |
| *H04L 12/40* | (2006.01) |
| *G06F 13/42* | (2006.01) |

(52) U.S. Cl.
CPC ...... *G06F 13/4027* (2013.01); *G06F 13/4221* (2013.01); *G08B 13/19695* (2013.01); *G08B 29/16* (2013.01); *H04L 12/40182* (2013.01); *H04L 12/40189* (2013.01); *G08B 13/19656* (2013.01)

(58) Field of Classification Search
CPC . G06F 13/4027; G06F 13/4221; G08B 29/16; G08B 13/19695; H04L 12/40182; H04L 12/40189
See application file for complete search history.

(56) References Cited

U.S. PATENT DOCUMENTS

| | | | | |
|---|---|---|---|---|
| 6,385,772 | B1 * | 5/2002 | Courtney | G08B 13/19602 348/143 |
| 6,832,121 | B1 * | 12/2004 | Albrecht | B41F 33/0018 700/79 |
| 7,099,755 | B2 | 8/2006 | Mueller et al. | |
| 2004/0243859 | A1 | 12/2004 | Mueller et al. | |

(Continued)

FOREIGN PATENT DOCUMENTS

| | | |
|---|---|---|
| CN | 1951015 A | 4/2007 |
| CN | 101247515 A | 8/2008 |

(Continued)

*Primary Examiner* — Nimesh G Patel
(74) *Attorney, Agent, or Firm* — Laurence Greenberg; Werner Stemer; Ralph Locher

(57) ABSTRACT

A hazard management system is provided with a field bus and a broadband bus. The field bus is configured to connect at least two units of the hazard management system for sending alarm signals among the units of a hazard management system. The broadband bus, which is separate from the field bus, is configured to connect at least two units of a hazard management system, so that these units may exchange data through the broadband bus. The broadband bus is configured to stream audio and/or video data from one unit to other units or to deploy software updates among the units of the hazard management system.

20 Claims, 1 Drawing Sheet

(56) References Cited

U.S. PATENT DOCUMENTS

| | | | | |
|---|---|---|---|---|
| 2004/0255193 A1* | 12/2004 | Larson | ................ | G06F 11/0745 |
| | | | | 714/26 |
| 2007/0177703 A1 | 8/2007 | Senba | | |
| 2012/0041572 A1* | 2/2012 | Halsall | .............. | H04L 12/40032 |
| | | | | 700/19 |
| 2014/0135947 A1* | 5/2014 | Friman | .............. | G05B 23/0267 |
| | | | | 700/29 |

FOREIGN PATENT DOCUMENTS

| | | | |
|---|---|---|---|
| EP | 1398746 | A1 | 3/2004 |
| EP | 1510988 | A2 | 3/2005 |
| EP | 1628875 | B1 | 8/2011 |
| EP | 2568457 | A1 | 3/2013 |
| RU | 2250504 | C1 | 4/2005 |
| RU | 2286604 | C2 | 10/2006 |
| WO | 2005055522 | A2 | 6/2005 |

\* cited by examiner

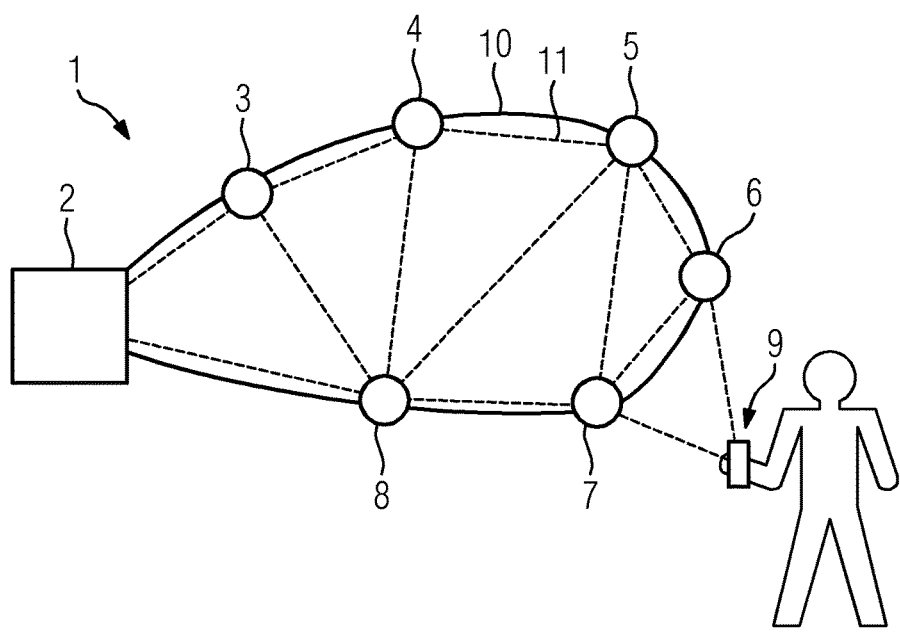

COMBINATION OF BUSES FOR A HAZARD MANAGEMENT SYSTEM, HAZARD MANAGEMENT SYSTEM, AND METHOD OF OPERATING THE HAZARD MANAGEMENT SYSTEM

CROSS-REFERENCE TO RELATED APPLICATION

This application claims the priority, under 35 U.S.C. § 119, of European patent application EP14152796, filed Jan. 28, 2014; the prior application is herewith incorporated by reference in its entirety.

BACKGROUND OF THE INVENTION

Field of the Invention

The present disclosure relates to communication buses to be used in a hazard management system. More specifically, the present disclosure relates to a hazard management system that uses one communications bus that focuses on reliability and another bus for transmission of large amounts of data.

Hazard management systems for applications such as smoke detection, intrusion detection, or water alarm are typically made up of a plurality of safety and security units. Safety units typically comprise smoke detectors, heat detectors, and flame detectors. Intrusion detectors, motion detectors, and door contacts are typical examples of security devices. Hazard management systems may also comprise at least one central unit for configuration and for monitoring individual safety and security units. A central unit is sometimes also referred to as a panel or as a management station. European published patent application EP 1 398 746 A1 describes a hazard management system with a detection unit and with a central unit. The central unit allows for an operator to change the settings of the safety and security units. A hazard management system may further provide an output unit such as a siren or a beacon. The commonly assigned European published patent application EP 2 568 457 A1 describes a hazard management system with an output unit that may activate an alarm. Combined forms of these units are also common. That is, a central unit may provide a siren and/or a detector.

The units of a hazard management system may be battery-powered. Especially in industrial environments the units would typically be connected to an external AC supply. The supply may also be backed up by an uninterruptible power supply (UPS).

Especially in industrial applications the individual detector units, the central unit and the output unit may be connected through a communications link. The communications link between the components of the hazard management system is hereafter referred to as a bus. The communications bus may be hard-wired or wireless or both. The above-noted publication EP 2 568 457 A1 discloses a radio-operated bus to connect a plurality of units.

The above-mentioned publication EP 1 398 746 A1 describes a combination of a hard-wired and of an optical link. The hard-wired link comprises resonant circuits 9, 10 that suppress noise while at the same time limiting the bandwidth of the bus.

The above-noted publication European published patent application EP 2 568 457 A1 also discloses how two input 14 and output units 16 of a hazard management system can be coupled through a communications module 20. The communication modules 20 of EP 2 568 457 A1 send and receive data to be processed by logical 26 or functional 32 modules. The link according to EP 2 568 457 A1 is wireless, nonetheless hard-wired links are typically implemented in a similar way.

Communications buses between the units of a hazard management system typically provide either reliability or large bandwidth, usually not both. Communications buses that focus on reliability are crucial in safety-relevant application where a hazard management system has to ensure an alarm is generated. They will hereafter be referred to as field buses. The very nature of a hazard management system necessitates an accurate, prompt, and reliable response in case of a fire or an intrusion into a building. Especially hazardous environments may require individual units to communicate via a fiber optic field bus in order to deal with the problem of electromagnetic interference.

It is often desirable for a hazard management system to provide units with firmware updates while these remain in service. In order to ensure the system remains responsive, a firmware update must not impair a field bus. The field bus may otherwise be fully loaded with a firmware update and not transfer safety-relevant information. Consequently, the hazard management system would no longer provide a prompt response.

Also, there may be a need for an operator to obtain additional information from a video camera built into a unit. An operator may, for instance, want to observe whether and where there is fire in a place where a fire alarm has gone off. In this case, a detector unit would provide a camera. The detector unit would then stream a video to an operator's computer in a control room. Similarly, an operator may want to verify a break-in in case an intrusion hazard management system has activated an alarm. Further, there may be a need for an operator to warn people by live voice messages.

SUMMARY OF THE INVENTION

The aim of the present disclosure is to at least mitigate the aforementioned difficulties and to provide buses for hazard management systems that meet the aforementioned requirements.

It is accordingly an object of the invention to provide a combination of buses in a hazard management system which overcomes the above-mentioned and other disadvantages of the heretofore-known devices and methods of this general type and which provides for a combination of buses that allow firmware updates of the units of the hazard management system.

With the foregoing and other objects in view there is provided, in accordance with the invention, a combination of buses for a hazard management system, the combination of buses comprising:

a field bus and a broadband bus separate from the field bus;

the field bus being configured to:
connect at least two units of the hazard management system, enabling the units to exchange data through the field bus; and
send alarm signals in among the units of the hazard management system;

the broadband bus being configured to:
connect at least two units of the hazard management system, enabling the units to exchange data through the broadband bus;

stream audio and/or video data from one unit to other units of the hazard management system or to deploy software updates among the units of the hazard management system;

the broadband bus further being configured to switch from an activated mode to a deactivated mode or to an idle mode; and the broadband bus being configured to be activated:

either through an activation signal sent from one unit of the hazard management system to another unit of the hazard management system through the field bus; or periodically for or a limited time span; or by an alarm signal generated by a unit of the hazard management system.

It is a related object of the present disclosure to provide a combination of buses for a hazard management system, such that the individual units remain in service during the firmware update.

The above problems are resolved by a combination of buses for a hazard management system according to the main claim of this disclosure. Preferred embodiments of the present disclosure are covered by the dependent claims.

It is also an object of the present disclosure to provide a combination of buses for a hazard management system that allows an operator to obtain video feedback from a unit of the hazard management system and/or to broadcast live voice messages.

It is a further object of the present disclosure to provide a combination of buses for a hazard management system, so that the hazard management system remains responsive at all times.

It is yet another object of the present disclosure to provide a combination of buses for a hazard management system that minimizes the power consumption of the units of a hazard management system, especially of battery-operated units.

It is yet another object of the present disclosure to provide a combination of buses, so that additional units can be added to the system. These additional units are then readily linked with the hazard management system through said combination of buses.

It is yet another object of the present disclosure to provide a combination of buses that allows for a reliable and cost-effective hazard management system.

It also is object of the present disclosure to provide a hazard management system that makes use of the aforementioned combination of buses.

It also is an object of the present disclosure to provide a hazard management system where each unit provides a (visible or indirect) indication of the status of its communications links to an operator.

Other features which are considered as characteristic for the invention are set forth in the appended claims.

Although the invention is illustrated and described herein as embodied in combination of buses for a hazard management system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE shows a hazard management system made up of a plurality of units. These units are configured to communicate through a combination of buses.

DETAILED DESCRIPTION OF THE INVENTION

Referring now to the sole FIGURE of the drawing in detail, there is shown a hazard management system, also referred to as a danger management system, with a plurality of units 2-8. The units 2-8 are connected through a field bus 10 (solid line). An additional broadband bus 11 (dashed line) links the units 2-9.

The unit 2 is a central unit. The safety and security units 3-8 can be configured and/or monitored through the central unit 2. Also, the central unit typically receives a signal whenever an alarm is generated by one of the safety and security units 3-8. The alarm signal is transmitted through the field bus 10.

The field bus 10 of the detection unit 1 shown in the FIGURE is arranged as a loop. The loop connects all the safety and security units 3-8 to the central unit 2.

In an alternative embodiment the field bus is star-shaped. In that case, the safety and security units 3-8 encircle the main unit 2. There will then be separate field bus connections starting from the main unit 2 and connecting to the safety and security units 3-8.

In yet another embodiment, the field bus is a combination of a star-shaped and a loop-shaped bus.

Typical examples of field buses are RS-232, RS485, FireWire, USB, BACnet. Also, proprietary systems known as P2 or Swing would typically be considered as field buses.

The unit 9 is a handheld device or a laptop computer or a computer in a control room that communicates with the hazard management system 1. An operator may obtain status information about the hazard management system 1 and its configuration through the unit 9. The unit 9 may also be used to receive a video or audio stream from a safety and security units 3-8 in case of a fire or in case of a break-in. Further, unit 9 may be used to deploy a firmware update among the units 2-8 of the hazard management system 1.

The mobile unit 9 communicates with the hazard management system 1 through a broadband bus 11. The broadband bus provides the bandwidth required for video streaming and/or firmware updates.

Typical examples of broadband buses would be WIFI, WLAN, Ethernet, and/or Bluetooth.

In order to save energy, the broadband bus 11 may be switched on and off. In a preferred embodiment, a signal is sent to a unit 2-8 through the field bus. Based on that signal, the unit then activates the broadband bus 11. In other words, a unit 2-8 would activate its WIFI bus as soon as it receives an activation signal from another unit 2-8.

In another preferred embodiment, the broadband bus 11 is activated periodically and for a limited time span only. This mode is particularly useful for hazard management systems 1 where firmware and/or software updates are periodically deployed.

In yet another preferred embodiment, the broadband bus 11 of a unit 2-8 is activated by the unit itself. Activation happens whenever an alarm is generated. This mode offers advantages for an operator who may connect his unit 9 to the unit 2-8 that has generated an alarm. The operator may then use a video camera of a unit 2-8 to check for burglars or for fire in the vicinity of the unit.

In yet another advantageous embodiment, a unit 2-8, after generating an alarm, sends an activation signal to adjacent units 2-8. Those adjacent units then also activate their broadband buses while the broadband buses of the remaining units remain deactivated or idle.

It is also possible, in an embodiment, for one of the units 2-8 to act as a router, for instance for WIFI signals. This particular embodiment allows for an extension of the broadband network within the hazard management system 1. That is, even when one or several units are spaced apart, they may communicate directly with one another. A remote unit that would normally be out of the WIFI range of most other units then receives firmware updates by having its data traffic forwarded through a router unit.

Both the field bus and the broadband bus require the units 2-9 to provide one or several communications modules.

The field bus 10 may be too weak to supply all the units 3-8 with sufficient (electrical) power to continuously run their communications modules for the broadband bus 11. Consequently, at least one unit (2-9) may provide an energy buffer. The energy buffer is configured to supply energy to at least one communications module of said unit (2-9) for a limited time span. The energy buffer can be implemented as any device configured to store electric energy such as a capacitor, a super-capacitor or a rechargeable battery.

A hazard management system 1 made up of the aforementioned units 2-8 may also comprise visible indicators. These visible indicators are mounted directly to the unit and provide information about the status of each of the buses. In a typical embodiment, green, and red LEDS indicate whether each of the field or broadband buses is up or down.

The combination of a special-purpose field bus and of a broadband bus offers distinct cost benefits. A dedicated-purpose field bus is designed for maximum reliability and may not be suited for video streaming or software updates. Likewise, WIFI connectors that may be procured off-the-shelf provide fast and broadband connections but lack the reliability of special purpose field buses. Because of the conflicting technical requirements of reliability and broadband capability, a modification of a field bus to provide broadband capabilities is not cost-effective. Instead, the combination of special-purpose field buses and of a broadband bus is the most advantageous solution in terms of cost and reliability.

It should be understood that the foregoing relates only to certain embodiments of the invention and that numerous changes may be made therein without departing from the spirit and the scope of the invention as defined by the following claims. It should also be understood that the invention is not restricted to the illustrated embodiments and that various modifications can be made within the scope of the following claims.

The invention claimed is:

1. A combination of buses for a hazard management system, the combination of buses comprising:
    a field bus configured to:
        connect at least two units of the hazard management system, enabling the units to exchange data through said field bus; and
        send alarm signals in among the units of the hazard management system;
    at least one broadband bus separate from said field bus, said broadband bus being configured to:
        connect at least two units of the hazard management system, enabling the units to exchange data through said broadband bus;
        stream audio and/or video data from one unit to other units of the hazard management system or to deploy software updates among the units of the hazard management system;
    said broadband bus further being configured to switch from an activated mode to a deactivated mode or to an idle mode; and
    said broadband bus being configured to:
        be activated periodically and for a limited time span; and
        to periodically deploy firmware updates upon activation;
    wherein said field bus is a permanently activated field bus.

2. The combination of buses according to claim 1, wherein at least one of said field bus or said broadband bus is bi-directional, enabling data to be sent through said bus from a first unit to a second unit and also from the second unit to the first unit.

3. The combination of buses according to claim 1, wherein at least one of said buses is wireless.

4. The combination of buses according to claim 1, wherein at least one of said buses is hard-wired.

5. The combination of buses according to claim 1, wherein the hazard management system has a plurality of units selected from the group of safety units, security units, and one or more central units, and said field bus is configured to connect to all of the plurality units of the hazard management system.

6. The combination of buses according to claim 1, wherein the hazard management system has a plurality of units selected from the group of safety units, security units, and one or more central units, and said broadband bus is configured to connect to selective some of the plurality of units of the hazard management system.

7. A hazard management system, comprising:
    a plurality of units selected from the group of safety units, security units, and one or more central units; and
    a combination of buses according to claim 1 interconnecting said plurality of units;
    wherein at least one of said units provides green and red light emitting diodes for providing an operator with indications whether each of the field bus and the broadband bus is activated or deactivated.

8. The hazard management system according to claim 7, wherein at least one of said units is configured to be a router for forwarding data from one unit to another unit.

9. The hazard management system according to claim 7, wherein at least one of said field bus or said broadband bus is bi-directional, enabling data to be sent through said bus from a first unit to a second unit and also from the second unit to the first unit.

10. The hazard management system according to claim 7, wherein at least one of said buses is wireless.

11. The hazard management system according to claim 7, wherein at least one of said buses is hard-wired.

12. The hazard management system according to claim 7, wherein the hazard management system has a plurality of units selected from the group of safety units, security units, and one or more central units, and said field bus is configured to connect to all of the plurality units of the hazard management system.

13. The hazard management system according to claim 7, wherein the hazard management system has a plurality of units selected from the group of safety units, security units, and one or more central units, and said broadband bus is configured to connect to selective some of the plurality of units of the hazard management system.

14. A hazard management system, comprising:
a plurality of units selected from the group of safety units, security units, and one or more central units; and
a combination of buses according to claim 1 interconnecting said plurality of units;
wherein at least one of said units is a handheld device or a laptop computer or a computer in a control room, and said at least one of said units is connected to said broadband bus.

15. The hazard management system according to claim 14, wherein at least one of said units is configured to be a router for forwarding data from one unit to another unit.

16. The hazard management system according to claim 14, wherein at least one of said field bus or said broadband bus is bi-directional, enabling data to be sent through said bus from a first unit to a second unit and also from the second unit to the first unit.

17. The hazard management system according to claim 14, wherein at least one of said buses is wireless.

18. The hazard management system according to claim 14, wherein at least one of said buses is hard-wired.

19. The hazard management system according to claim 14, wherein the hazard management system has a plurality of units selected from the group of safety units, security units, and one or more central units, and said field bus is configured to connect to all of the plurality units of the hazard management system.

20. The hazard management system according to claim 14, wherein the hazard management system has a plurality of units selected from the group of safety units, security units, and one or more central units, and said broadband bus is configured to connect to selective some of the plurality of units of the hazard management system.

* * * * *